United States Patent

Miyasaka

[11] Patent Number: 6,155,691
[45] Date of Patent: Dec. 5, 2000

[54] LIGHT ILLUMINATING TYPE MANIPULATION AND DISPLAY APPARATUS

[75] Inventor: Yasuhiro Miyasaka, Miyagi-ken, Japan

[73] Assignee: Alps Electric Co., Ltd., Japan

[21] Appl. No.: 09/324,537

[22] Filed: Jun. 2, 1999

[30] Foreign Application Priority Data

Jun. 5, 1998 [JP] Japan .................................. 10-157725

[51] Int. Cl.[7] .................................................. G01D 11/28
[52] U.S. Cl. .................................. 362/30; 362/29; 362/85; 362/28; 200/316
[58] Field of Search ................................ 362/28, 29, 30, 362/85; 200/316

[56] References Cited

U.S. PATENT DOCUMENTS 4,918,577  4/1990  Furudate .................................. 362/31
4,930,048  5/1990  Ito ............................................. 362/26

Primary Examiner—Sandra O'Shea
Assistant Examiner—Ali Alavi
Attorney, Agent, or Firm—Brinks Hofer Gilson & Lione

[57] ABSTRACT

In a light illuminating type manipulation and display apparatus including a light source and rotary knobs having a plurality of stop positions and indicator sections which are illuminated and displayed with the light from the light source at each of the stop positions. In the apparatus, light reflecting bodies having a plurality of light reflecting surfaces corresponding to a plurality of the stop positions of the rotary knobs are disposed, and the light from the light source is reflected from each of the light reflecting surfaces of the light reflecting bodies and illuminates the indicator sections located at each of the stop positions. With this arrangement, the quality of the apparatus can be improved with reduced power consumption.

6 Claims, 5 Drawing Sheets

LIGHT ILLUMINATING TYPE MANIPULATION AND DISPLAY APPARATUS

BACKGROUND OF THE INVENTION

1. Field of the Invention

The present invention relates to a light illuminating type manipulation and display apparatus which is mounted on, for example, a vehicle and the like, and more specifically, to a light illuminating type manipulation and display apparatus using a single light source.

2. Description of the Related Art

Ordinarily, when display panels are illuminated, it is sufficient to individually dispose light sources just below subjects to be illuminated such as, for example, indicator sections, display sections and the like. With this arrangement, however, the number of the light sources is increased, whereby power consumption as well as the number of parts are increased so that cost is made high and an assembling job becomes troublesome.

To cope with this problem, conventionally, vehicle-mounted light illuminating type manipulation and display apparatuses and the like comprise a lamp housing composed of a white molded body, a single light source inserted into the lamp housing, a rotary knob, which has a plurality of stop positions and an indicator section illuminated and displayed by with light from the light source. The light from the light source is reflected from the inner surface of the lamp housing and indicator section is illuminated and displayed with the reflected light.

With this arrangement, since the number of the lamp required is only one, power consumption is low and the number of parts is reduced as well as cost and the number of working processes are also decreased. However, this arrangement also has drawbacks.

That is, the rotary knob (indicator section) has a plurality of the stop positions some of which are located near to the light source and the others of which are located far therefrom. Further, an approximately constant quantity of light is reflected from the lamp housing. Thus, when the indicator section stops at a position relatively near to the light source, it is bright. However, when the indicator section is far from the light source, it is made dark, and this is undesirable from a quality standpoint.

To solve the above problem, it can be conceived to increase the illumination intensity of a light source itself. However, this solution has a drawback in that power consumption and the heating value generated by the light source are increased.

SUMMARY OF THE INVENTION

An object of the present invention is to solve the drawbacks of the prior art and to provide a light illuminating type manipulation and display apparatus by which power consumption can be reduced and the quality of the apparatus can be improved.

To achieve the above object, the present invention is directed to a light illuminating type manipulation and display apparatus which includes a light source and a rotary knob having a plurality of stop positions and an indicator section which is illuminated and displayed with the light from the light source at each of the stop positions. In the light illuminating type manipulation and display apparatus, a light reflecting body which has at least one or more light reflecting surfaces corresponding to the plurality of stop positions of rotary knob are disposed, the light from the light source is reflected from each of the light reflecting surfaces of the light reflecting body and illuminates the indicator section located at each of the stop positions.

As described above, according to the present invention, the disposition of the light reflecting body permits the light from the light source to be individually reflected from the respective reflecting surfaces of the light reflecting body and to illuminate the indicator sections which stop at the respective stop positions. Accordingly, the indictor section can be uniformly illuminated at any position where it is stopped regardless of that the position is far from or near to the light source, whereby the quality of the manipulation and display apparatus as a product can be improved. Further, the indicator section located at the respective stop positions can be brightly illuminated with the light reflecting body even if the illumination intensity of the light source is not increased higher than necessary and the heating value generated by the light source can be reduced.

DESCRIPTION OF THE PREFERRED EMBODIMENT

Figure 1:
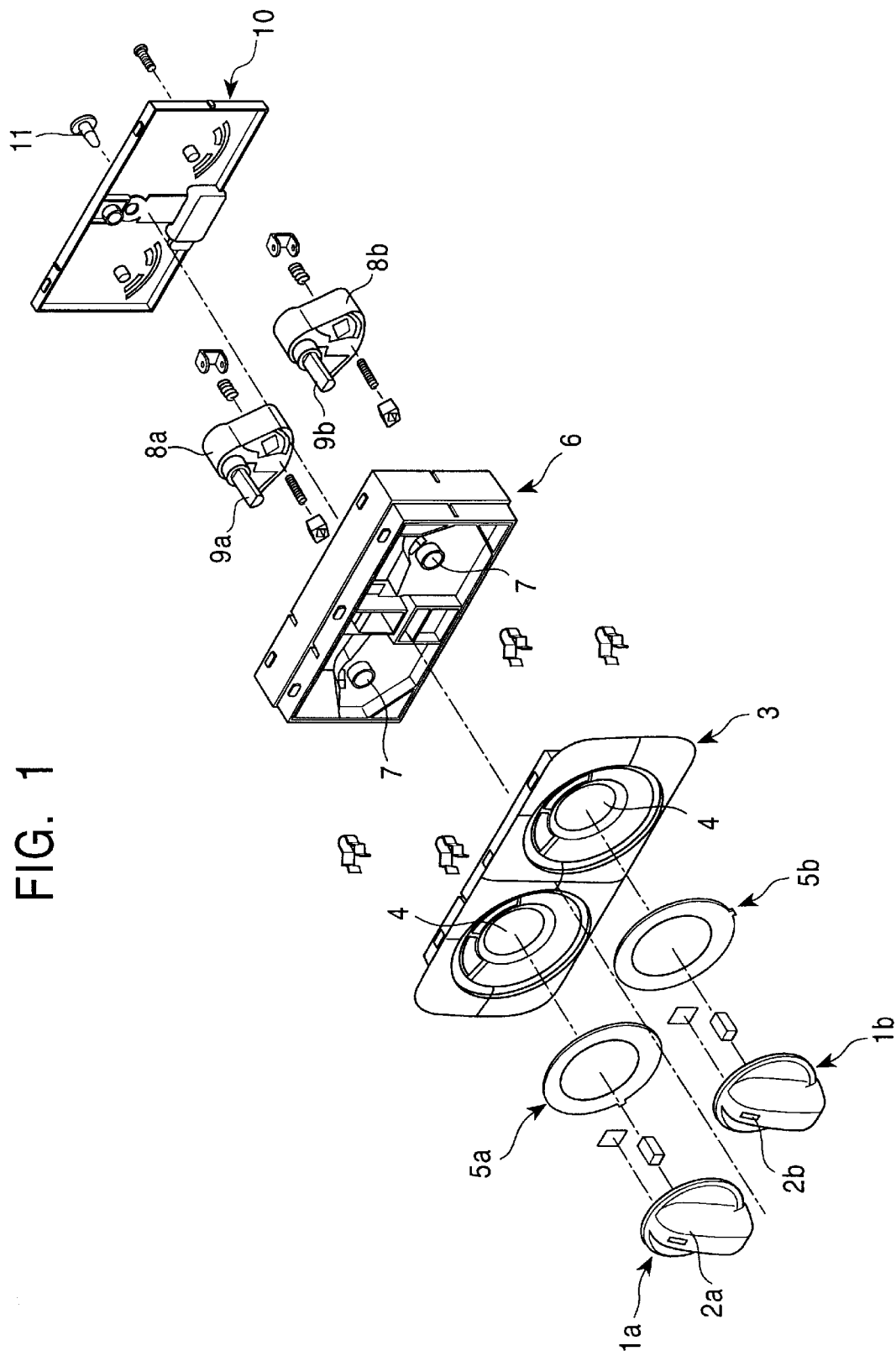
FIG. 1 is an exploded perspective view of a light illuminating type manipulation and display apparatus according to an embodiment of the present invention.

An embodiment of the present invention will be described with reference to the accompanying drawings. FIG. 1 is an exploded perspective view of a vehicle-mounted light illuminating type manipulation and display apparatus according to the embodiment. First, the schematic arrangement of the apparatus will be described in its entirety.

In FIG. 1, numeral 1a denotes a rotary fan knob having a knob portion and numeral 1b denotes a rotary mode knob having a knob portion. Semi-transparent indicator sections 2a and 2b are formed to the extreme ends of the respective knob portions. Numeral 3 denotes a display panel provided with two circular openings 4, 4. A fan display ring 5a and a mode display ring 5b are bonded to the front surface of the display panel 3 concentrically with the openings 4, 4.

Numeral 6 denotes an approximately box-shaped lamp housing having two through-holes 7, 7, and the display panel 3 is coupled with the front surface of the lamp housing 6. Numerals 8a and 8b denotes a fan shaft and a mode shaft, respectively. The drives shaft 9a and 9b of the fan shaft 8a and the mode shaft 8b are coupled with the rotary fan knob 1a and the rotary mode knob 1b, respectively through the through-holes 7, 7 of the lamp housing 6 and the openings 4, 4 of the display panel 3.

Numeral 10 denotes a casing for closing the rear surface of the lamp housing 6. The shafts 8a and 8b are rotatably interposed between the lamp housing 6 and the casing 10 so as to stop at a plurality of stop positions. The stop position information of the shafts 8a and 8b is supplied to a controller (not shown) from the manipulation and display apparatus. Numeral 11 denotes a lamp as a illumination light source which is inserted into and disposed in the lamp housing 6 so as to confront it.

Figure 2:
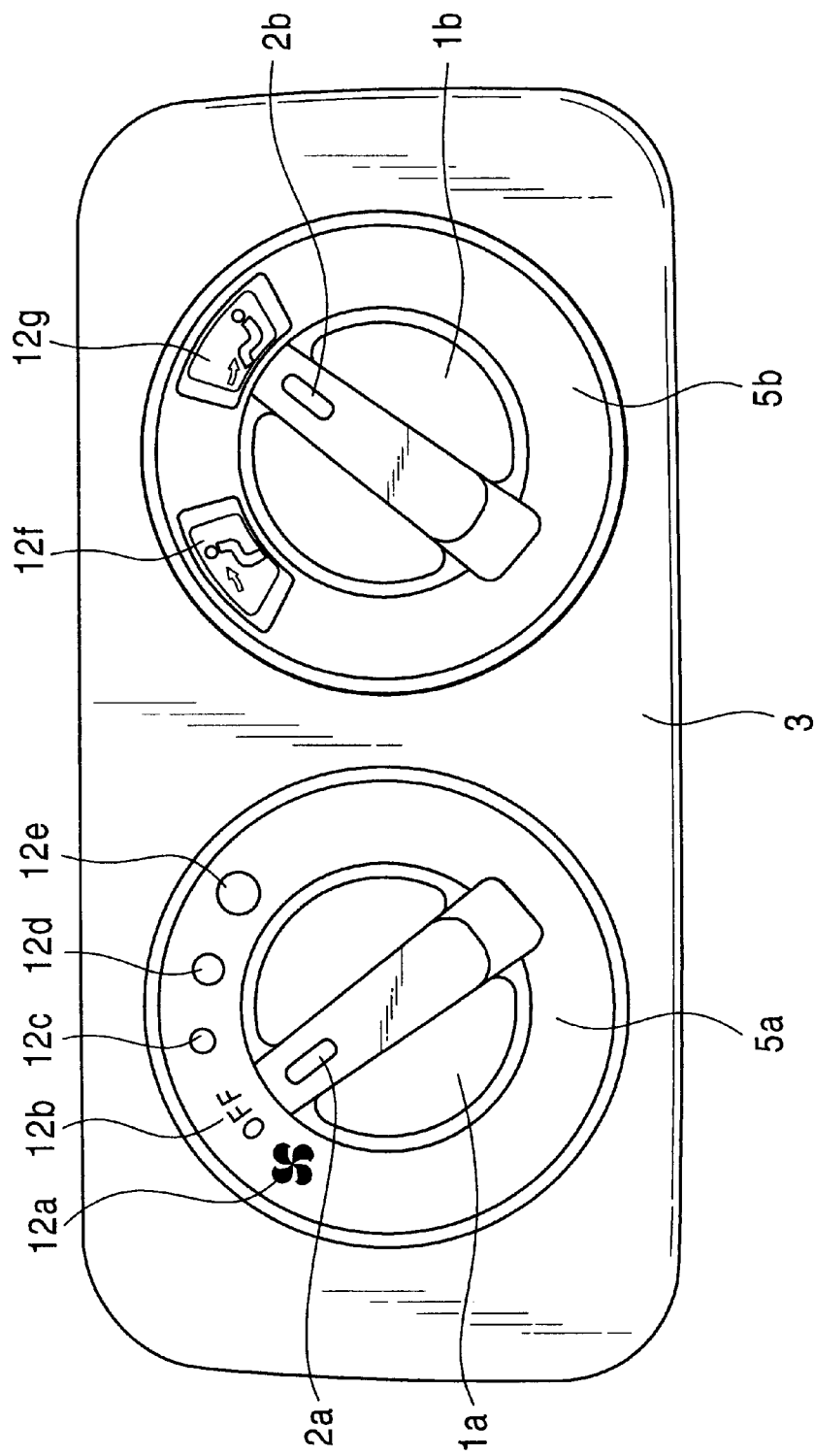
FIG. 2 is a front elevational view of the manipulation and display apparatus.

FIG. 2 is a front elevational view of the light illuminating type manipulation and display apparatus. As shown in the figure, the fan display ring 5a and the mode display ring 5b are bonded on the display panel 3 separately from each other. The rotary fan knob 1a is rotatably disposed inwardly of the fan display ring 5a and the rotary mode knob 1b is rotatably disposed inwardly of the mode display ring 5b, respectively.

As shown in the figure, a display section 12a composed of a mark of fan, a display section 12b composed of a character of "OFF" and display sections 12c, 12d and 12e composed of circles whose diameters are gradually increased are disposed to the fan display ring 5a at preset intervals, respectively. The respective display section 12a to 12e are made semi-transparent. The three circles whose diameters are gradually increased show a different amount of air supplied by a fan. The rotary fan knob 1a can stop at the four positions of the display sections 12b to 12e and the indicator section 2a of the rotary fan knob 1a confronts any one of the display sections 12b to 12e at a position where the rotary fan knob 1a stops.

Display sections 12f and 12g, which are composed of two pictures showing a different direction of air supplied by the fan, are disposed to the mode display ring 5b at preset intervals, and the respective display sections 12f and 12g are made semi-transparent. The rotary mode knob 1b can stop at two positions of the display sections 12f and 12g, and the indicator section 2a of the rotary mode knob 1b confronts any one of the display sections 12f and 12g at a position where the rotary mode knob 1b stops.

Figure 3:
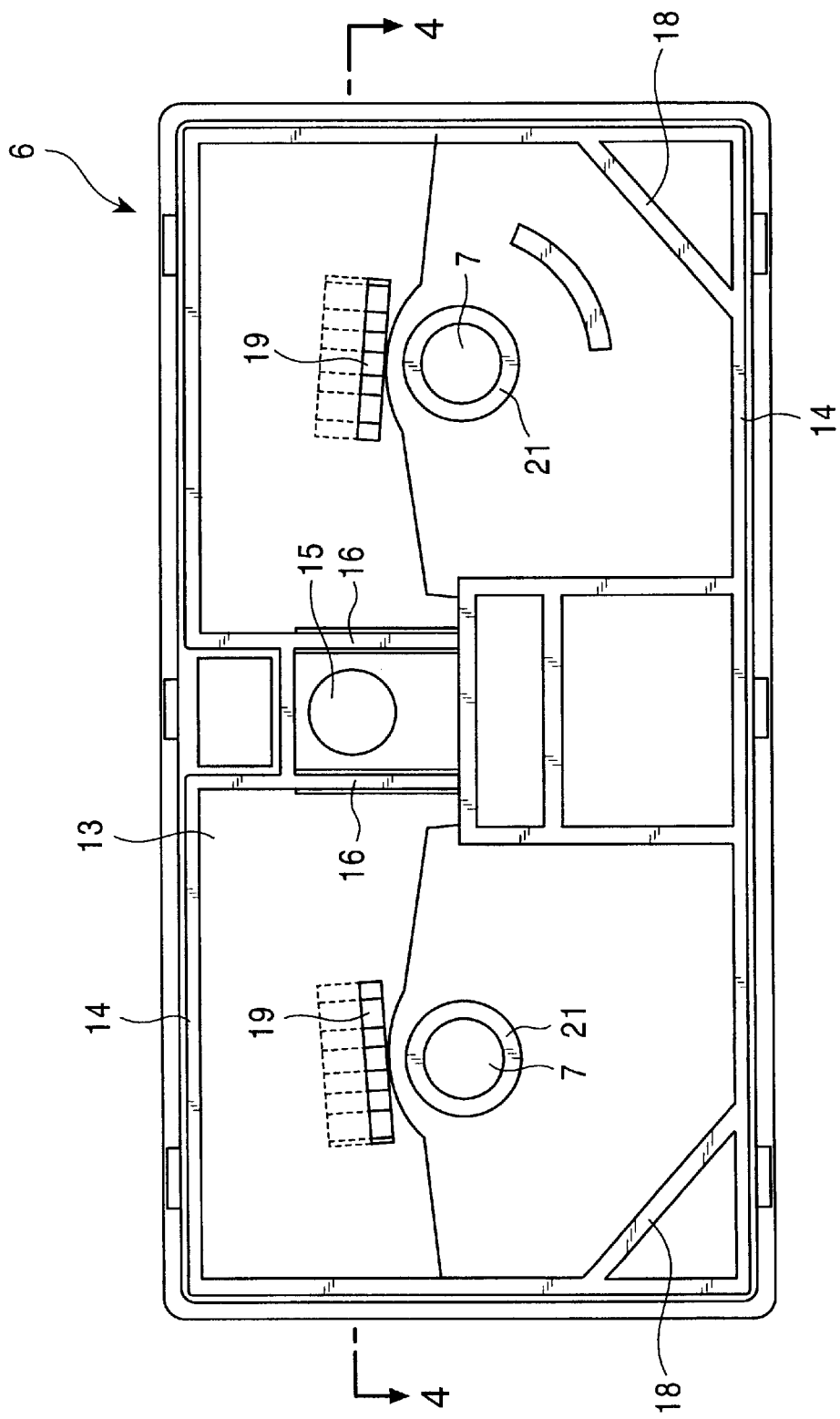
FIG. 3 is a plan view of a lamp housing used to the manipulation and display apparatus.
Figure 4:
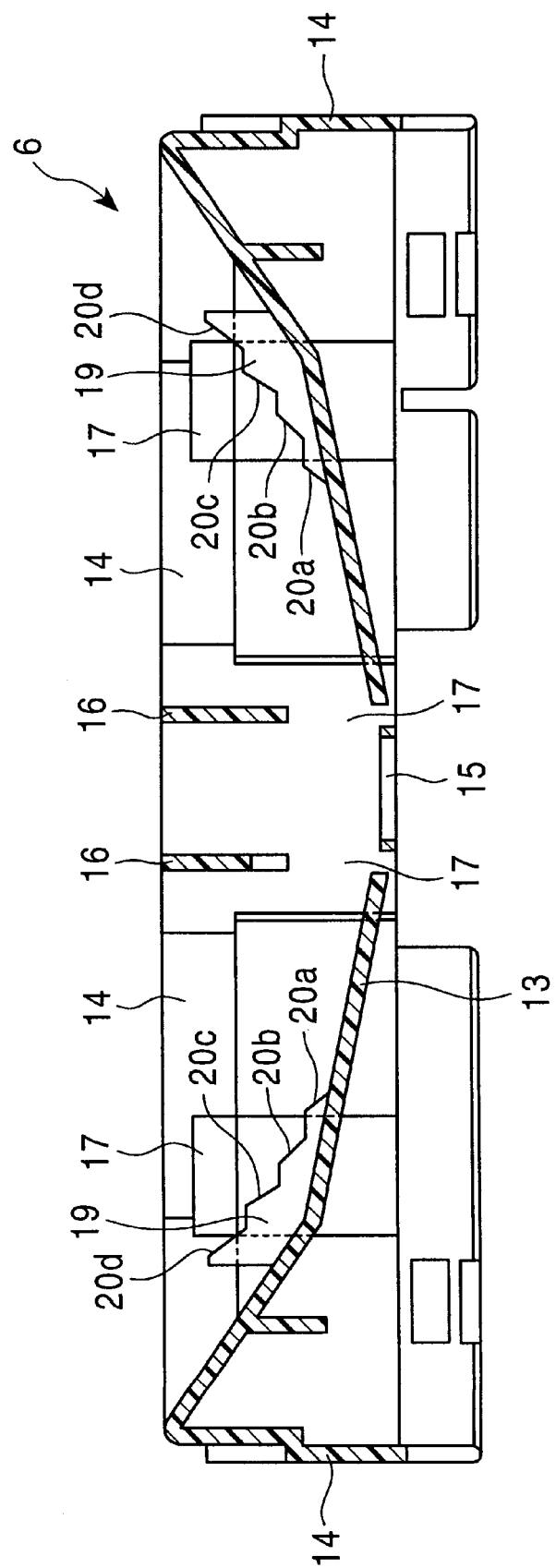
FIG. 4 is a sectional view of the lamp housing taken along the line 4—4 in FIG. 3.
Figure 5:
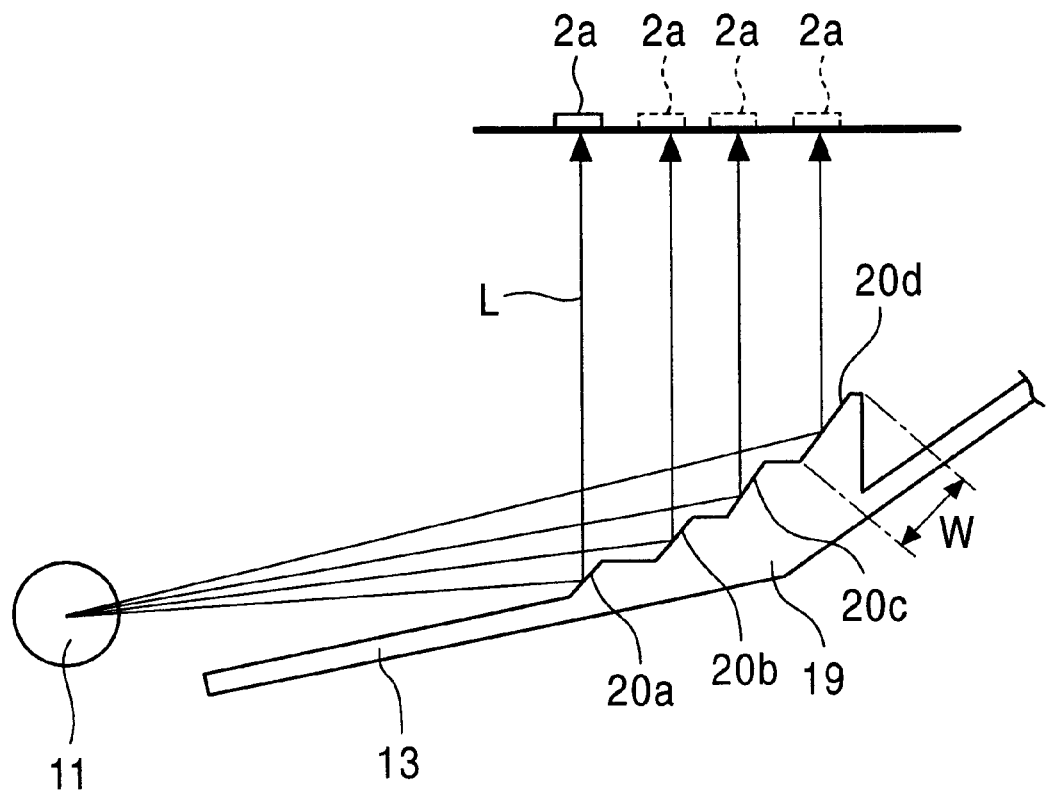
FIG. 5 is an explanatory view of a light reflecting body used to the manipulation and display apparatus.

FIG. 3 shows a plan view of the lamp housing 6, FIG. 4 is a sectional view of the lamp housing 6 taken along the line 4—4 in FIG. 3, and FIG. 5 is an explanatory view of one of light reflecting bodies 19 molded integrally with the lamp housing 6.

The lamp housing 6 is composed of a white molded body having a high reflectance in its entirety. The lamp housing 6 is composed of a bottom wall 13 and a peripheral wall 14 surrounding the bottom wall 13 so that it is formed to an approximately box-shape as a whole. A lamp insertion hole 15 is formed to the bottom wall 13 approximately at the center of it. Partition walls 16, 16 are formed on both the sides of the lamp insertion hole 15, and cutouts 17 are formed on the lamp insertion hole 15 side of the partition walls 16, 16 as shown in FIG. 4. The bottom wall 13 partly inclines so as to gradually rise from the lamp insertion hole 15 side toward the right and left peripheral wall 14.

The through-holes 7, 7 are formed to the bottom wall 13 to permit the drive shafts 9a and 9b of the shafts 8a and 8b to pass therethrough and circumferential walls 14, 14 are disposed around the through-holes 7, 7, whereby shaft support sections 21 and 21 are formed. As shown in FIG. 3, corner walls 18 and 18 are disposed to the corners of the peripheral walls 14, 14 which are far from the lamp insertion hole 15. Two chambers are formed right and left by the corner walls 18 and 18, the peripheral walls 14 and 14, partition walls 16, 16 and bottom wall 13.

The light reflecting bodies 19 and 19 stand from the bottom wall 13 in the vicinities of the shaft support sections 21 and 21 integrally therewith. As shown in FIG. 5, each of the light reflecting bodies 19 and 19 includes a first inclined surface 20a, a second inclined surface 20b which is one step higher than the first inclined surface 20a, a third inclined surface 20c which is one step higher than the second inclined surface 20b, and a fourth inclined surface 20d which is one step higher than the third inclined surface 20c and furthest from the lamp 11. The respective inclined surfaces are connected to each other through flat surfaces and formed stepwise. While a definitely angular-shaped stepwise shape is formed in the embodiment by the repetition of the inclined surfaces and the flat surfaces, the inclined surfaces may be connected to each other through an arc surface. Accordingly, the distance between a light reflecting surface 20, which is far from the lamp 11, and the stop position of the indicator section 2a, which stops at the position corresponding to the reflecting surface 20 is shorter than the distance between a light reflecting surface 20, which is near to the lamp 11, and the stop position of the indicator section 2a, which stops at the position corresponding to the reflecting surface 20, as shown in FIG. 5 (the distance between the light reflecting surface 20d and the stop position of the indicator section 2a<the distance between the light reflecting surface 20c and the stop position of the indicator section 2a<the distance between the light reflecting surface 20b and the stop position of the indicator section 2a<the distance between the light reflecting surface 20a and the stop position of the indicator section 2a).

Further, as shown in the figure, the longitudinal width W of each inclined surface 20 is gradually increased from the first inclined surface 20a to the fourth inclined surface 20d. Therefore, a light reflecting area (light receiving area) is gradually increased from the first inclined surface 20a, which is nearest to the lamp 11, to the fourth inclined surface 20d, which is farthest from the lamp 11 (the light reflecting area of the light reflecting surface 20a<the light reflecting area of the light reflecting surface 20b<the light reflecting area of the light reflecting surface 20c<the light reflecting area of the light reflecting surface 20d). The inclining angles of the respective surfaces are designed such that the light beam L from the lamp 11 illuminates the indicator section 2a stopped at the position corresponding to the display section 12e from the backside of the indicator section 2a in the first inclined surface 20a; the light beam L illuminates the indicator section 2a stopped at the position corresponding to the display section 12d from the backside of the indicator section 2a in the second inclined surface 20b; the light beam L illuminates the indicator section 2a stopped at the position corresponding to the display section 12c from the backside of the indicator section 2a in the third inclined surface 20c; and the light beam L illuminates the indicator section 2a stopped at the position corresponding to the display section 12b from the backside of the indicator section 2a in the fourth inclined surface 20d.

Further, the positional relationship between the indicator section 2a and the light reflecting body 19 is set such that, for example, the light beam L incident on the central portion of the first inclined surface 20a illuminates the central portion of the indicator section 2a (this is also applied to the cases in which the indicator section 2a is located at other stop positions). The respective display sections 12a to 12e are illuminated with the light reflected from the inclined bottom wall 13, the peripheral wall 14 and the corner wall 18.

The indicator section 2b of the rotation knob 1b for adjusting an air supply mode is also illuminated with the other light reflecting body 19 similarly to the indicator section 2a, and the display sections 12f and 12g are illuminated with the inclined bottom wall 13 and the like similarly to the display sections 12a to 12e.

While the embodiment describes the case in which only the indicator sections of the rotary knobs are illuminated with the light reflecting bodies, the indicator sections at the respective stop positions and the respective display sections of the display rings can be illuminated and displayed when, for example, the lateral widths of the light reflecting bodies are increased as shown by the dotted lines of FIG. 3.

While the embodiment describes the case in which the present invention is applied to the vehicle-mounted light illuminating type manipulation and display apparatus, it is not limited thereto. That is, the present invention is applicable to the technologies of other equipment and devices such as, for example, various kinds of electric appliances of household use and business use, measuring instruments, automatic controllers and the like.

As described above, according to the present invention, the disposition of the light reflecting body permits the light from the light source to be individually reflected from the respective reflecting surfaces of the light reflecting body and to illuminate the indicator sections stopped at the stop positions. Accordingly, the indictor section can be uniformly illuminated at any position where it is stopped regardless of that the position is far from or near to the light source, whereby the quality of the manipulation and display apparatus as a product can be improved. Further, the indicator section located at the respective stop positions can be brightly illuminated with the light reflecting body even if the illumination intensity of the light source is not increased higher than necessary and the heating value generated by the light source can be reduced.

What is claimed is:

1. A light illuminating type manipulation and display apparatus comprising:

a light source;

a rotary knob having a plurality of stop positions and an indicator section which is illuminated and displayed with the light from said light source at each of the stop positions; and a light reflecting body having at least one or more light reflecting surfaces corresponding to the plurality of stop positions of said rotary knob, wherein the light from said light source is reflected from each of the light reflecting surfaces of said light reflecting body and illuminates the indicator section located at each of the stop positions.

2. The light illuminating type manipulation and display apparatus according to claim 1, wherein the distance between a light reflecting surface which is far from said light source and the stop position of the indicator section which stops at the position corresponding to the light reflecting surface is shorter than the distance between a light reflecting surface which is near to said light source and the stop position of the indicator section which stops at the position corresponding to the light reflecting surface.

3. The light illuminating type manipulation and display apparatus according to claim 1, wherein, among the plurality of light reflecting surfaces, a light reflecting surface which is far from said light source has a reflecting area larger than that of a light reflecting surface which is near to said light source.

4. The light illuminating type manipulation and display apparatus according to claim 1, wherein the positional relationship between each reflecting surface and each position where the indicator section stops is held such that a light beam incident on the central portion of each light reflecting surface illuminates the central portion of the indicator section which corresponds to each light reflecting surface.

5. The light illuminating type manipulation and display apparatus according to claim 1, wherein the light reflecting body is disposed integrally with a lamp housing.

6. The light illuminating type manipulation and display apparatus according to claim 1, wherein said light source is disposed approximately at the center of said lamp housing, said rotary knobs are disposed on both sides of said light source at preset intervals, and said light reflecting bodies are disposed in the light passages from said light source to the rotational regions of the indicator sections of said rotary bodies, respectively.

* * * * *